United States Patent
Czainski et al.

(10) Patent No.: US 9,688,157 B2
(45) Date of Patent: Jun. 27, 2017

(54) PROVIDING VEHICLES WITH ELECTRIC ENERGY BY MAGNETIC INDUCTION

(71) Applicant: Bombardier Transportation GmbH, Berlin (DE)

(72) Inventors: Robert Czainski, Szczecin (PL); Jeremie Desjardins, Courbevoie (FR); Marnix Lannoije, Balen (BE); Jing Gao, Viernheim (DE)

(73) Assignee: Bombardier Transportation GmbH, Berlin (DE)

( * ) Notice: Subject to any disclaimer, the term of this patent is extended or adjusted under 35 U.S.C. 154(b) by 284 days.

(21) Appl. No.: 14/409,528

(22) PCT Filed: Jun. 24, 2013

(86) PCT No.: PCT/EP2013/063154
§ 371 (c)(1),
(2) Date: Dec. 19, 2014

(87) PCT Pub. No.: WO2014/001263
PCT Pub. Date: Jan. 3, 2014

(65) Prior Publication Data
US 2015/0321566 A1     Nov. 12, 2015

(30) Foreign Application Priority Data
Jun. 27, 2012 (GB) .................... 1211476.5

(51) Int. Cl.
*B60L 11/18* (2006.01)
*H01F 38/14* (2006.01)
*H01F 41/00* (2006.01)

(52) U.S. Cl.
CPC ......... *B60L 11/182* (2013.01); *B60L 11/1824* (2013.01); *H01F 38/14* (2013.01);
(Continued)

(58) Field of Classification Search
CPC .................... B60L 11/182; B60L 11/1824
(Continued)

(56) References Cited

U.S. PATENT DOCUMENTS 9,299,492 B2 * 3/2016 Nakahara ............... H01M 10/46
2004/0066643 A1   4/2004 Beihoff et al.
(Continued)

FOREIGN PATENT DOCUMENTS

CN       102165669 A    8/2011
CN       102333668 A    1/2012
(Continued)

*Primary Examiner* — Zachary Kuhfuss
(74) *Attorney, Agent, or Firm* — The Webb Law Firm (57) ABSTRACT

An arrangement for providing a vehicle with electric energy, wherein the arrangement includes a generating device for inducing an alternating electric current by magnetic induction in a corresponding receiving device, wherein the arrangement comprises a base to which the generating device is attached, the base defines a vehicle location an elevated region sideways of the vehicle location, wherein an upper surface of the elevated region is elevated compared to an upper surface of the base under the vehicle location, an elongated profile includes an electrically conducting material and/or a magnetizable material, wherein the elongated profile is attached to the elevated region and extends along an extension of the generating device in a longitudinal direction of the arrangement and wherein an elevated profile extends upwards towards a level of the upper surface of the elevated region and also extends towards the vehicle location.

15 Claims, 5 Drawing Sheets

(52) U.S. Cl.
CPC .......... *H01F 41/00* (2013.01); *B60L 2200/18* (2013.01); *B60L 2200/26* (2013.01); *B60L 2200/36* (2013.01); *B60L 2270/147* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/14* (2013.01); *Y10T 29/49021* (2015.01)

(58) Field of Classification Search
USPC .......................................................... 191/10
See application file for complete search history.

(56) References Cited

U.S. PATENT DOCUMENTS

| | | | |
|---|---|---|---|
| 2007/0064406 A1 | 3/2007 | Beart | |
| 2011/0094840 A1* | 4/2011 | Sakita | B60L 5/005 191/2 |
| 2011/0163542 A1* | 7/2011 | Farkas | B60L 11/005 290/2 |
| 2011/0231029 A1 | 9/2011 | Ichikawa et al. | |
| 2011/0259694 A1 | 10/2011 | Matsumura | |
| 2012/0055751 A1 | 3/2012 | Vollenwyder et al. | |
| 2012/0186927 A1 | 7/2012 | Suh et al. | |
| 2012/0242447 A1* | 9/2012 | Ichikawa | B60L 11/182 336/84 C |
| 2013/0233663 A1* | 9/2013 | Czainski | B60L 5/005 191/10 |
| 2013/0248311 A1 | 9/2013 | Czainski et al. | |
| 2014/0042823 A1 | 2/2014 | Nakahara et al. | |
| 2014/0203768 A1* | 7/2014 | Andic | H02J 7/00 320/108 |
| 2014/0232331 A1* | 8/2014 | Stamenic | B60L 11/182 320/108 |

FOREIGN PATENT DOCUMENTS

| | | |
|---|---|---|
| CN | 102348574 A | 2/2012 |
| GB | 2476318 A | 6/2011 |
| GB | 2485617 A | 5/2012 |
| JP | 57160758 A | 10/1982 |
| KR | 20110074350 A | 6/2011 |
| WO | 2010031595 A2 | 3/2010 |
| WO | 2011077225 A2 | 6/2011 |
| WO | 2011078616 A2 | 6/2011 |
| WO | 2012144640 A1 | 10/2012 |

* cited by examiner

PROVIDING VEHICLES WITH ELECTRIC ENERGY BY MAGNETIC INDUCTION

CROSS-REFERENCE TO RELATED APPLICATIONS

This application is the United States national phase of International Application No. PCT/EP2013/063154 filed Jun. 24, 2013, and claims priority to United Kingdom Patent Application No. 1211476.5 filed Jun. 27, 2012, the disclosures of which are hereby incorporated in their entirety by reference.

BACKGROUND OF THE INVENTION

Field of the Invention

The invention relates to an arrangement for providing a vehicle with electric energy, wherein the arrangement comprises a generating device adapted to generate an alternating electromagnetic field for inducing an alternating electric current by magnetic induction in a corresponding receiving device. The arrangement comprises a base to which the generating device is attached. The base defines a vehicle location where a vehicle may be placed or may travel through. Furthermore, the invention relates to a method of manufacturing the arrangement and to a method of providing a vehicle with electric energy using the arrangement.

Description of Related Art

In particular, the present invention can be applied to any land vehicle, in particular track bound vehicles, such as rail vehicles (e.g. trams), but also to road automobiles, such as individual (private) passenger cars, commercial trucks or public transport vehicles (e.g. busses). Preferably, the primary side conductor arrangement of the generating device which produces the alternating electromagnetic filed is integrated in the track, road or parking area of the vehicle so that the electric lines of the primary side conductor arrangement extend in a plane which is nearly parallel to the surface of the road, track or parking area on which the vehicle may travel or may be parked.

Details of a preferred embodiment of the primary side conductor arrangement are described in WO 2010/031595 A2. For example, the current lines of the primary side conductor arrangement may extend along the track or road in a serpentine manner, i.e. some sections of the lines extend transversely to the travel direction and some sections of the lines extend in the direction of travel, thereby connecting the transversely extending sections. In particular, as illustrated in FIG. 5 and FIG. 12 of WO 2010/031595 A2, the primary side conductor arrangement preferably produces a magnetic wave which propagates in the direction of travel or opposite to the direction of travel. The speed of the wave is determined by the distance of the transversely extending sections and by the frequency of the alternating current which is carried by the different phases of the primary side electric conductor arrangement.

As also described by WO 2010/031595 A2, the receiving device can be located at the underside of a vehicle and may be covered by a ferromagnetic body, such as a body in the shape of a slab or plate. A suitable material is ferrite. The body bundles and redirects the field lines of the magnetic field and therefore reduces the field intensity above the body to nearly zero.

However, such a body of ferromagnetic material or, alternatively, a shield of electrically conducting material, cannot reduce the field intensity of the electromagnetic field to zero at locations sideways of the body or shield. In particular, while persons are entering or leaving the vehicle, they might pass the area sideways of the receiving device. Therefore, corresponding limits of the field intensity apply and must not be exceeded. For example, the International Commission on non-ionizing radiation protection (ICNIRP) has issued recommendations for corresponding limits.

Not only the primary side generating device, but also the secondary side receiving device of the vehicle produces an electromagnetic field during operation of the system for transferring the energy to the vehicle. If an electric voltage is induced in the electric conductor or electric conductors of the receiving device (which is sometimes called pick up), and if a corresponding electric current flows, this current produces an electromagnetic field.

Especially if the vehicle is provided with electric energy by induction while the vehicle travels, the gap between the primary side generating device and the secondary side receiving device is large compared to static systems, such as conventional transformers. Therefore, comparatively high frequencies of typically at least 1 kHz up to more than 100 kHz are chosen for the primary side alternating current and, therefore, for the produced electromagnetic field.

Persons, in particular passengers and staff, may approach the generating device during operation, in particular while a vehicle stands or approaches the location. At stopping areas where public transport vehicles regularly stop for allowing passengers to enter and to leave the vehicles, persons may even remain over longer periods of a time next to the generating device. Although the generating device is typically not operated continuously, operation may start at least shortly before the vehicle enters the location next to the person or persons.

It is an object of the present invention to provide an arrangement for providing a vehicle with electric energy, a method of manufacturing the arrangement and a method of providing a vehicle with energy by means of a receiving device which reduce the field intensity sideways of the generating device and/or sideways of the receiving device, in particular the exposure of persons sideways of the location where the vehicle stands or drives.

In particular, the generating device may have the serpentine (alternatively called: meandering) configuration described in WO 2010/031595 A2. Alternatively, the generating device may comprise at least one coil of an electric conductor. Other configurations are also possible, such as straight or slightly curved electric lines which extend in parallel to the path of travel of the vehicle.

SUMMARY OF THE INVENTION

It is a basic idea of the present invention to attach an elongated profile of shielding material in an elevated region sideways of the vehicle location, where a vehicle may be place or may travel through. The elevated region may be, for example, a pavement along a street and/or an elevated region at a vehicle stop. The upper surface of the elevated region is positioned at a higher level than the electric conductors of the generating device and/or than the surface of a base on which the vehicle may stand or drive while it is provided with energy by the generating device. Persons may stand or walk on the upper surface of the elevated region. If viewed in a cross sectional area particular to the longitudinal direction of the elongated profile, the profile preferably shields the area above the upper surface of the elevated region from magnetic field lines of the electromagnetic field which would advance from below or sideways of the elevated region to the upper surface of the elevated region, provided that the elongated profile were not present. In order to achieve this shielding effect, the elongated profile extends towards the side of the location where the vehicle may stand or drive (in the following: the vehicle location). In particular, a horizontal section of the elongated profile, i.e. a section which extends in horizontal direction, may shield the area above the upper surface of the elevated region. Similarly, a substantially horizontal section of the elongated profile would shield as well.

In addition, the elongated profile may comprise a second section which extends upwards towards the level of the upper surface of the elevated region. For example, this second section may extend in vertical direction. However, it is also possible that this second section extends upwards in an inclined fashion (i.e. comprising a slope).

Optionally, the first section (e.g. the horizontal or substantially horizontal section) and the second section (the section which extends upwards) may be connected to each other so that the two sections form a single elongated profile. However, it is also possible that the first section and the second section belong to separate pieces of material. In this case, these pieces may abut to each other, but a small gap between the pieces would not reduce the shielding effect significantly.

Alternatively, the elongated profile may not comprise first and second sections, but the same section of the elongated profile may extend upwards towards the upper surface of the elevated region and—along the same extension—may extend towards the vehicle location. For example, if a cross sectional area is considered, the elongated profile may extend in a straight linear direction (at constant slope) upwards and towards the vehicle location. Furthermore, it is possible that the elongated profile comprises a section which extends upwards, a further section which extends upwards and towards the vehicle location and another section which extends towards the vehicle location.

According to a preferred embodiment, the elongated profile is L-shaped, i.e. comprises a first section which substantially extends in horizontal direction and a second section which extends in vertical direction. Alternatively, the elongated profile may be T-shaped, i.e. comprising a first section extending towards the vehicle location and a second vertical section which joins the first section in a middle region of the first section.

In particular, the following is proposed: An arrangement for providing a vehicle with electric energy, wherein the arrangement comprises a generating device adapted to generate an alternating electromagnetic field for inducing an alternating electric current by magnetic induction in a corresponding receiving device, wherein the arrangement comprises
- a base to which the generating device is attached, which base defines a vehicle location where a vehicle may be placed or may travel through,
- an elevated region sideways of the vehicle location, wherein an upper surface of the elevated region is elevated compared to an upper surface of the base under the vehicle location,
- an elongated profile comprising an electrically conducting material and/or a magnetizable material,
wherein the elongated profile is attached to the elevated region and extends along the extension of the generating device in a longitudinal direction of the arrangement and wherein the elevated profile—if viewed in a cross sectional area perpendicular to the longitudinal direction—extends upwards towards a level of the upper surface of the elevated region and also extends towards the vehicle location.

Furthermore, a method is proposed of manufacturing an arrangement for providing a vehicle with electric energy, wherein
- a generating device is provided which is adapted to generate an alternating electromagnetic field for inducing an alternating electric current by magnetic induction in a corresponding receiving device,
- the generating device is attached to a base, which defines a vehicle location where a vehicle may be placed or may travel through,
- an elevated region is provided sideways of the vehicle location, wherein an upper surface of the elevated region is elevated compared to an upper surface of the base under the vehicle location,
- an elongated profile comprising an electrically conducting material and/or a magnetizable material is attached to the elevated region, so that the elongated profile extends along the extension of the generating device in a longitudinal direction of the arrangement and the elevated profile—if viewed in a cross sectional area perpendicular to the longitudinal direction—extends upwards towards a level of the upper surface of the elevated region and also extends towards the vehicle location.

In addition, a method is proposed of providing a vehicle with electric energy using a generating device to generate an alternating electromagnetic field for inducing an alternating electric current by magnetic induction in a corresponding receiving device, wherein
- a base is attached to the generating device, which base defines a vehicle location where the vehicle may be placed or may travel through,
- an elevated region is provided sideways of the vehicle location, wherein an upper surface of the elevated region is elevated compared to an upper surface of the base under the vehicle location,
- an elongated profile comprising an electrically conducting material and/or a magnetizable material is used to shield the environment from the alternating electromagnetic field,
wherein the elongated profile is attached to the elevated region and extends along the extension of the generating device in a longitudinal direction of the arrangement and wherein the elevated profile—if viewed in a cross sectional area perpendicular to the longitudinal direction—extends upwards towards a level of the upper surface of the elevated region and also extends towards the vehicle location.

Embodiments of the method of providing vehicles with energy follow from the description of the arrangement and from the description of the method of manufacturing the arrangement.

The elongated profile may comprise or consist of an electrically conducting material, such as aluminium. In addition or alternatively, the elongated profile may consist of or may comprise (see below) magnetizable material. The electromagnetic field induces electric currents in electrically conducting material and, therefore, a compensating electromagnetic field is generated which interferes with the external field and cancels this external field at least partially on the opposite side of the shield. In contrast, a magnetizable material redirects magnetic flux lines of the electromagnetic field and, therefore, can reduce the field intensity on the opposite side of the shield significantly.

If the elongated profile comprises the electrically conducting material and the magnetizable material, it is preferred that these two kinds of material form individual layers and that the layers extend in parallel to each other. In any case it is preferred that the magnetizable material is located closer to the base than the electrically conducting material.

The base to which the generating device is attached is, for example, a track of a vehicle (such as a road for automobiles and/or for buses or a railway for rail vehicles, e.g. trams) or the ground of a stopping area, where vehicles may stop or may be parked (such as a bus stop or a stop of a rail vehicle, so that passengers can enter or leave the vehicle at the stopping area, or a garage).

The term "attached" includes different cases, namely that the generating device is fully integrated in the material of the base, that the generating device is partially integrated in the material of the base and that the generating device is connected to the base or is placed on top of the base so that it rests on the basis.

Similarly, the elongated profile may be fully integrated in the material of the elevated region, may be partially integrated in the material of the elevated region and/or may be connected to the material of the elevated region. It is preferred that the elongated profile is fully integrated in the material of the elevated region. However, alternatively, a section of the elongated profile may form at least part of the upper surface of the elevated region.

In particular, the generating device comprises at least one phase line for conducting a phase of an alternating current. Preferably, the generating device comprises a plurality of phase lines for conducting different phases of an alternating current. During operation, the alternating current flows through the phase line or phase lines of the generating device and, thereby, produces the electromagnetic field to be received by the receiving device of a vehicle on a secondary side of the system. In particular, the generating device also comprises an electrically insulating material which covers the surface of the phase line or phase lines so that the line or line is insulated. Optionally, the generating device may also comprise material which keeps the phase line or phase lines in form. For example, the at least one phase line may meander in a longitudinal direction of the generating device. This longitudinal direction may be the direction of travel or may be parallel to the direction of travel of a vehicle which is to be provided with energy by the system. An example of meandering phase lines is given in WO 2010/031595 A2. However, alternative configurations of the generating device are possible, such as at least one coil of a phase line which is arranged in turns around a central axis of the coil. Another alternative is that the at least one phase line directly (i.e. not in a meandering way) extends in the direction of travel (or parallel to the direction of travel).

The elevated region comprises an upper surface which is elevated compared to an upper surface of the base on which the vehicle may be placed or may travel. The term "elevated" means that the upper surface of the elevated region extends on a higher level, in particular above ground level.

In particular, the elongated profile may consist of and/or may be made of material in the form of a sheet or plate. For example, a metal sheet may have been creased to form the profile having a first section extending upwards and having a second section extending towards the vehicle location, if viewed in the cross section. A specific example is a profile in the shape of an L.

According to an embodiment, the elongated profile comprises a plurality of gaps between sections consisting of the electrically conducting material and/or the magnetizable material. This has the advantage that electrically conducting material and/or magnetizable material can be saved and eddy currents induced by the electromagnetic field can be avoided. On the other hand, at least gaps which are significantly narrower than the width of sections consisting of electrically conducting material and/or magnetizable material do not reduce the shielding effect of the elongated profile significantly. In case of the magnetizable material, the lengths of the gaps can be as large as the lengths of the profile segments or can be smaller, for example.

In addition or alternatively, the elongated profile may consist of profile segments which are embedded in the elevated region. Preferably, the profile segments all have the same profile shape and are aligned to form the elongated profile.

According to a preferred embodiment, at least some of the gaps are filled by magnetizable material.

More generally speaking, the elongated profile may comprise a compound of the electrically conducting material with another material, which is magnetizable material. For example, as mentioned above, the elongated profile may be made of a sheet-like or plate-like material, wherein a first layer (in particular a layer closer to the base) made of the magnetizable material may be covered by a second layer (in particular a layer further away from the base compared to the first layer) made of the electrically conducting material. Alternatively, elongated stripes of the magnetizable material may be embedded (e.g. covered on both sides) in the electrically conducting material. For example, the stripes may be placed on a first sheet of electrically conducting material and a second sheet of electrically conducting material may be placed on top of the arrangement. Then, the at least the two sheets of electrically conducting material may be joined to each other.

Using magnetizable material as shielding material has the advantage that flux lines of the magnetic field are guided within the material. Compared to the situation without the presence of the shielding material, at least some of the magnetic flux lines cannot permeate the magnetizable material. Instead, these magnetic flux lines are redirected in the direction of extension of the magnetizable material.

In particular, magnetizable material can be used which has small electric conductibility, for example ferrites. As a result, the effects of electric currents which are induced in the shielding material are reduced.

More generally speaking, the magnetizable material may be ferromagnetic, paramagnetic or ferrimagnetic. A preferred material is ferrite. Other possible materials are, for example, iron powder (e.g. oxidized iron powder which is pressed to form the desired shape) and iron particles with an optional coating layer of plastic (these iron particles may be pressed together to form the desired shape). It is preferred that the magnetizable material has a magnetic susceptibility of at least 10, preferably at least 50.

Preferably, at least the upper section of the elongated profile (and optionally the whole elongated profile) is located above the level of the upper surface of the base and/or above the generating device. In particular, the elongated profile may extend towards the vehicle location in its upper section. Therefore, the area above the elevated region is effectively shielded from the electromagnetic field.

In particular, the arrangement may comprise two of the elevated regions sideways of the vehicle location, wherein the two elevated regions are arranged on opposite sides of the vehicle location and wherein an elongated profile is attached to each of the two elevated regions in the manner described above and below.

Furthermore, the invention covers a system for transferring energy to a vehicle, wherein the system comprises an arrangement with the primary side generating device, which is arranged along a path of travel of the vehicle or at a parking area or stopping area of the vehicle, and wherein the system comprises the arrangement with the secondary side receiving device of one of the embodiments described in this description.

BRIEF DESCRIPTION OF THE DRAWINGS

Examples of the invention will be described in the following with reference to the attached figures.

FIG. 1 schematically shows a vehicle which stops at a vehicle location or drives through a vehicle location, where a receiving device of the vehicle receives an electromagnetic field which is generated by a generating device, FIG. 2 the arrangement shown in FIG. 1, wherein elevated regions on opposite sides of the vehicle location comprise elongated profiles for shielding the electromagnetic fields which are produced—during operation—by the generating device and by the receiving device, FIG. 3 a top view of the arrangement shown in FIG. 2, wherein the upper surfaces of the elevated regions are considered to be transparent, FIG. 4 a side view of one of the elevated regions of FIG. 2 and FIG. 3, wherein the elevated region is considered to be transparent, FIG. 5 a cross section similar to the right part of the cross section shown in FIG. 2, wherein the generating device also extends under the elevated region, FIG. 6 a partial cross section similar to the partial cross section shown in FIG. 5, wherein the elevated region comprises a modified elongated profile for shielding the area above the elevated region from the electromagnetic field produced by the generating device, FIG. 7 a partial cross section of an arrangement similar to the arrangements shown in FIG. 2-FIG. 6, comprising a third embodiment of an elongated profile for shielding, FIG. 8 a partial cross section comprising a fourth embodiment of an elongated profile, FIG. 9 a partial cross section comprising a fifth embodiment of an elongated profile and FIG. 10 a cross-sectional view of a region of an elongated profile which comprises a plurality of gaps or cavities.

DETAILED DESCRIPTION OF THE INVENTION

Figure 1:
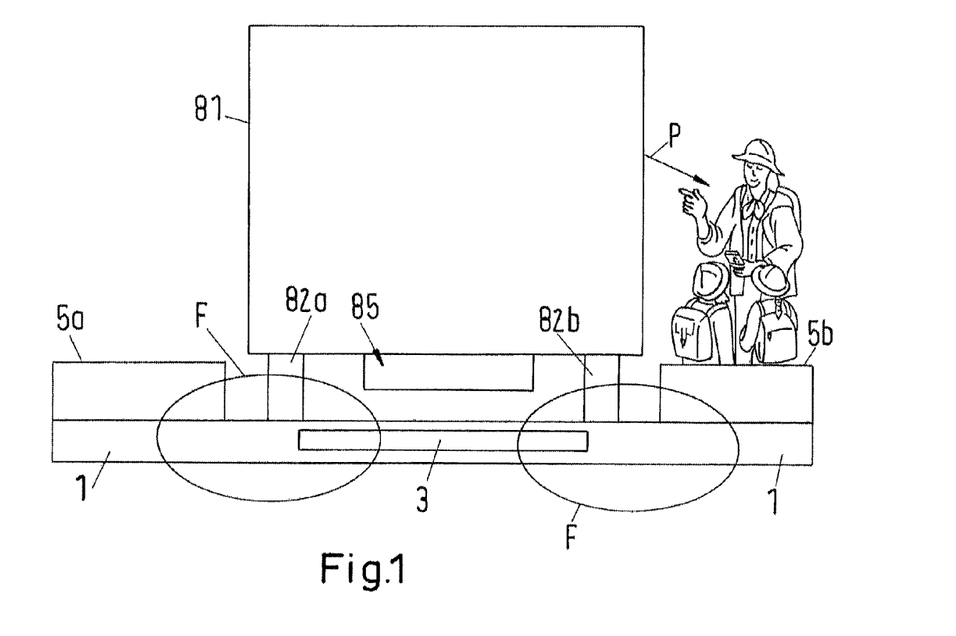

FIG. 1 shows a vehicle location (in the example: at a bus stop where passengers P can enter or leave a bus, which vehicle location may alternatively be the location where a tram can stop) which is occupied by a vehicle 81. A primary side generating device 3 may comprise an electric conductor arrangement (not shown in detail) which is embedded in a base 1, which may be, for example, the cover layer or another layer of the road or track on which the vehicle 81 may travel. The upper surface of the base 1 defines the bottom of the location where the vehicle 81 may stand or drive while the receiving device 85 of the vehicle 81 receives the electromagnetic field produced by the primary side generating device 3. For example, the primary side conductor arrangement may be designed as described in WO 2010/031595 A2 in connection with FIG. 1 in the document.

Generally, the primary side conductor arrangement (i.e. the line arrangement of the generating device) may be located underground or above ground. In particular in the case of railways having two rails on which wheels of rail vehicles may roll, the conductor arrangement may be located above ground between the rails on the level of a railway sleeper, or partly above ground, but under the railway sleepers.

The vehicle 81 comprises at its underside the receiving device 85 for receiving the electromagnetic field which is produced by the primary side conductor arrangement. The receiving device 85 may electrically be connected to an on-board electric network (not shown) so that the electric energy, which is induced in the receiving device 85 may be distributed within the vehicle 81. In particular, the alternating current which is produced by magnetic induction in the receiving device 85 can be rectified by a rectifier and/or the electric energy can be used to charge an energy storage of the vehicle 81, such as a conventional battery and/or an arrangement of super caps.

In the example shown in FIG. 1, magnetic flux lines F are schematically shown in the area of the wheels 82a, 82b of the vehicle 81. Unless specific means are provided, further flux lines will traverse the elevated regions 5a, 5b which are located on opposite sides of the vehicle location and these flux lines will extend through the area above the elevated regions 5a, 5b where the passengers P may stand or walk. However, as will be described in the following in connection with FIGS. 2 to 9, specific means are provided in order to reduce the field strength above the elevated regions 5a, 5b.

Figure 2:
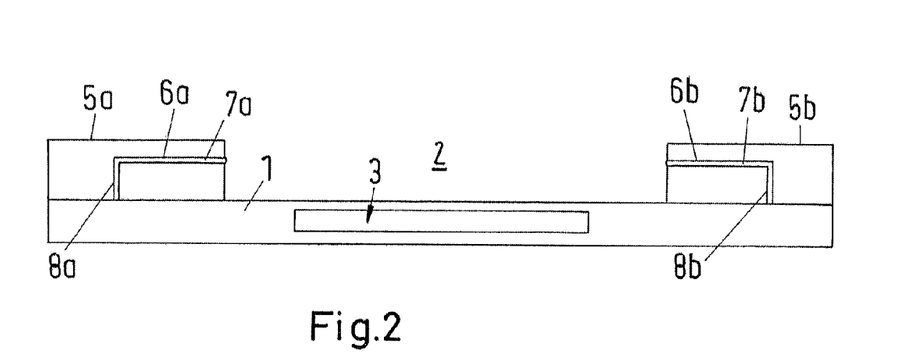

FIG. 2 shows an elongated profile 6a, 6b in each of the elevated regions 5a, 5b on the opposite sides of the vehicle location 2, which is delimited by the upper surface of the base 1 and by the side surfaces of the elevated regions 5a, 5b which face each other. The elongated profiles 6a, 6b extend in the direction perpendicular to the cross section shown in FIG. 2. Preferably, and this is not limited to the examples shown in the figures, the cross sectional shape of the elongated profile or profiles is constant along the extension of the elongated profile in the longitudinal direction (which is the direction perpendicular to the image plane of FIG. 2 in the example).

In the embodiment shown in FIG. 2, the elongated profiles 6a, 6b comprise an L-shaped cross section wherein a first section or limb 7a extends in horizontal direction towards the vehicle location 2 (or away from it) and wherein a second section or second limb 8a, 8b extends in vertical direction above the upper surface of the base 1 towards the upper surface of the elevated region 5a, 5b. The ends of the sections 7a, 8a; 7b, 8b are connected to each other so that the L-shape results.

The dimensions of the first and second sections 7, 8 relative to each other can be chosen in a different manner. For example, the length of the first section can be equal to the length of the second section. In the example shown in FIG. 2, the length of the first section 7 is larger than the length of the second section 8. However, other embodiments are possible, wherein the length of the second section is larger than the length of the first section.

Further modifications are possible. For example, the angle between the first section and the second section is not necessarily equal to 90°. Therefore, the first section may not exactly extend in horizontal direction and/or the second section may not extend exactly in vertical direction. Some other possible modifications will be described with reference to FIG. 5-9.

Figure 3:
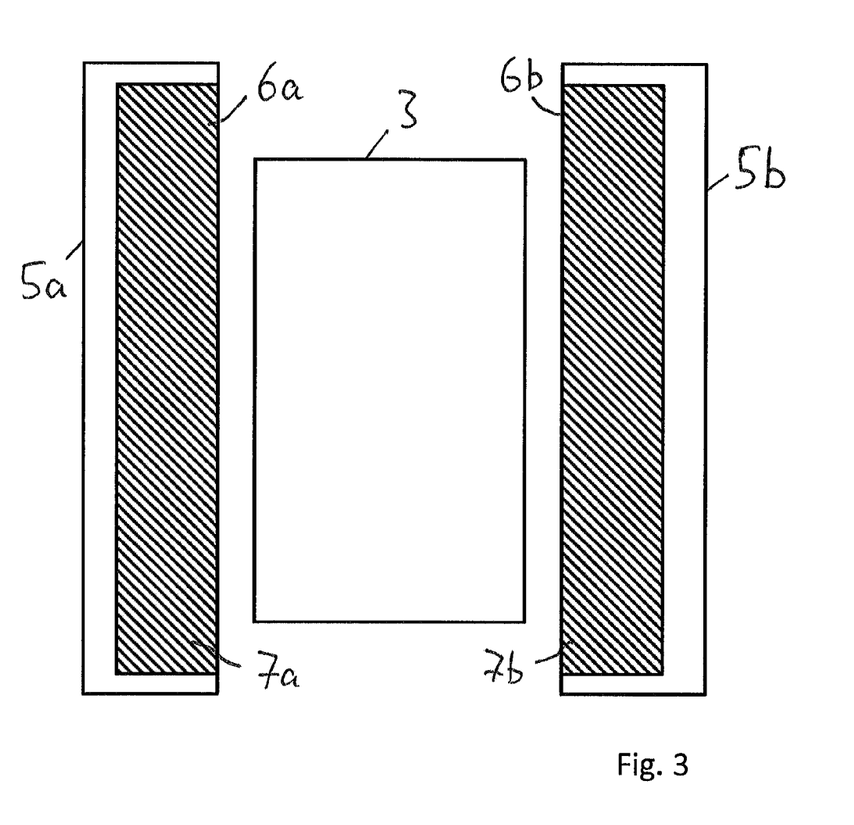

FIG. 3 shows a top view of the arrangement of FIG. 2. As mentioned above, the material of the elevated regions 5a, 5b is considered to be transparent, although the material is typically non-transparent in practice. For example, the elevated regions may be made of concrete. As a result, FIG. 3 shows the complete upper surfaces of the first sections 7a, 7b of the elongated profiles 6a, 6b. These elongated profiles 6 extend in the longitudinal direction (the vertical direction in the image plane of FIG. 3). Preferably, the extension of the elongated profiles 6 in the longitudinal direction is larger than the longitudinal extension of the generating device 3, which is also shown in FIG. 3 as if the material of the base 1 would be transparent.

Figure 4:
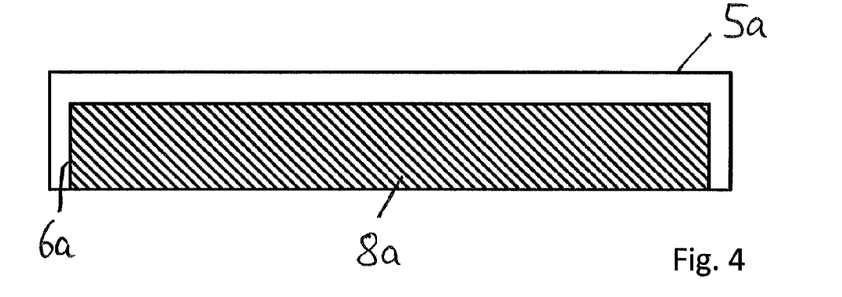

FIG. 4 shows a corresponding side view of the elevated region 5a. The longitudinal direction of the arrangement extends from left to right or from right to left in FIG. 4. Consequently, FIG. 4 shows the complete outer surface of the second section 8a of the elongated profile 6a.

An L-shaped elongated profile, as shown in the example of FIG. 2-FIG. 4, has the advantage that the second section, which substantially or exactly extends in vertical direction towards the upper surface of the elevated region, shields the area beyond the second section (if viewed from the vehicle location) from the electromagnetic filed produced by the generating device or produced by the receiving device mounted to the vehicle. Therefore, the first section, which would otherwise need to extend further away from the vehicle location in order to shield the region above the elevated region, can end at the upper end of the second section.

Figure 5:
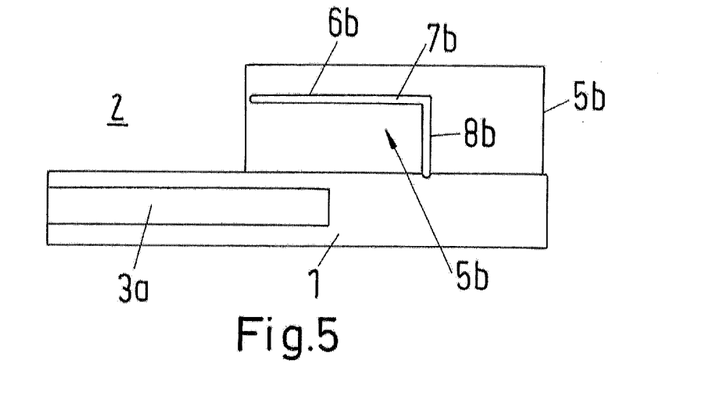

FIG. 5 shows the same embodiment of the elongated profile 6b as shown in FIG. 2-FIG. 4, but the generating device 3a extend further sideways, so that part of the generating device 3a is located under the elevated region 5b. However, the right end of the generating device 3a is positioned under the first section 7b of the elongated profile 6b, so that the elongated profile 6b effectively shields the complete area above the elevated region 5b from the electromagnetic field which is generated during operation of the generating device 3a.

Figure 6:
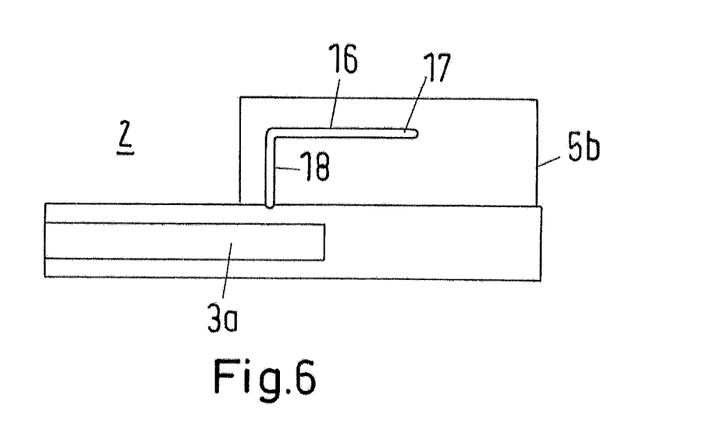

FIG. 6 shows a modification of the arrangement of the elongated profile 16 embedded in the elevated region 5b. The generating device 3a also extends under the elevated region 5b. However, the second section 18 of the L-shaped elongated profile 16 is positioned at the end of the first section 17 which is closer to the vehicle location 2. The shielding effect of the arrangement shown in FIG. 6 may not be as effective as the shielding effect of the arrangement shown in FIG. 5, but it still reduces field intensities in the area above the elevated region 5b significantly.

Figure 7:
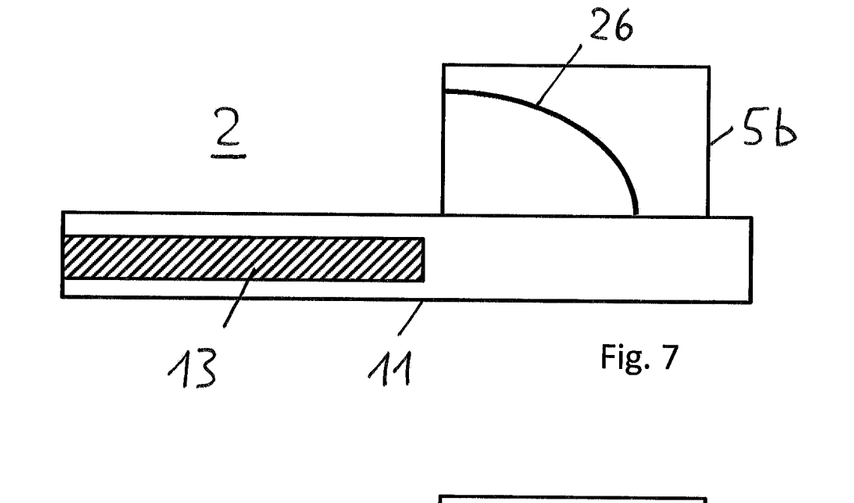

FIG. 7 shows another, third embodiment of an elongated profile 26 and its arrangement within the elevated region 5b. FIG. 7 also shows a modification of the arrangement of the base 11 which extends further towards the right. The right hand side end of the generating device 13 which is embedded in the base 11 is positioned close to but not under the elevated region 5b. The cross sectional profile of the elongated profile 26 is curved, wherein the lower end of the profile 26 is positioned at the interface between the base 11 and the elevated region 5b. It extends upwards towards the upper surface of the elevated region 5b, but the slope continuously decreases in the course towards the upper end, which is positioned in this example at the side surface of the elevated region 5b which faces and delimits the vehicle location.

Figure 8:
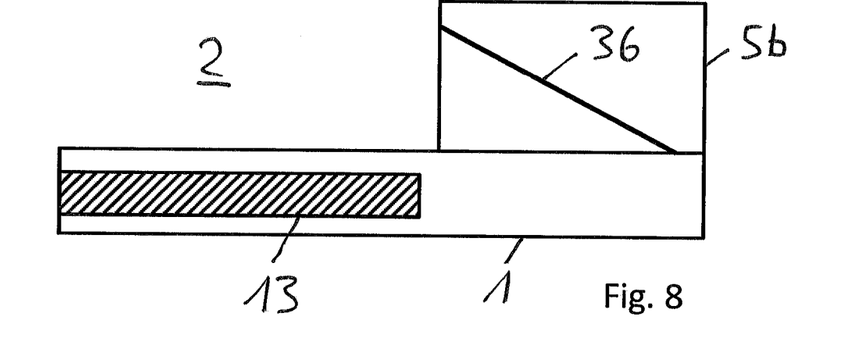

FIG. 8 shows a fourth example of the cross section shape of the elongated profile 36. This profile has a constant slope along the extension from the lower end to the upper end.

Figure 9:
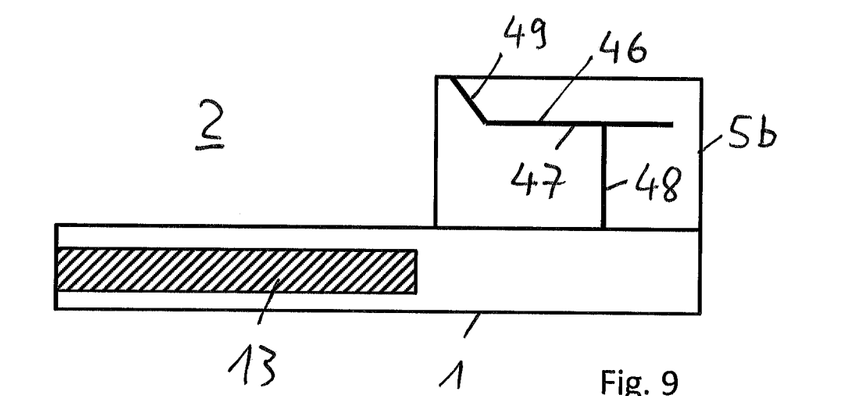

The cross sectional profiles of the elongated profile which are shown in FIG. 2-FIG. 8 are relatively simple. A more complicated shape is shown in the example of FIG. 9. A first section 47 of the elongated profile 46 extends in horizontal direction towards the vehicle location 2. Similar to the L-shape shown in FIG. 2, FIG. 5 and FIG. 6, there is a second, vertically extending section 48. However, the first section 47 extends further beyond the upper end of the second section 48, if viewed from the vehicle location. In addition, there is a third section 49 which starts at the inner end of the first section 46 and has a constant slope in this example.

Figure 10:
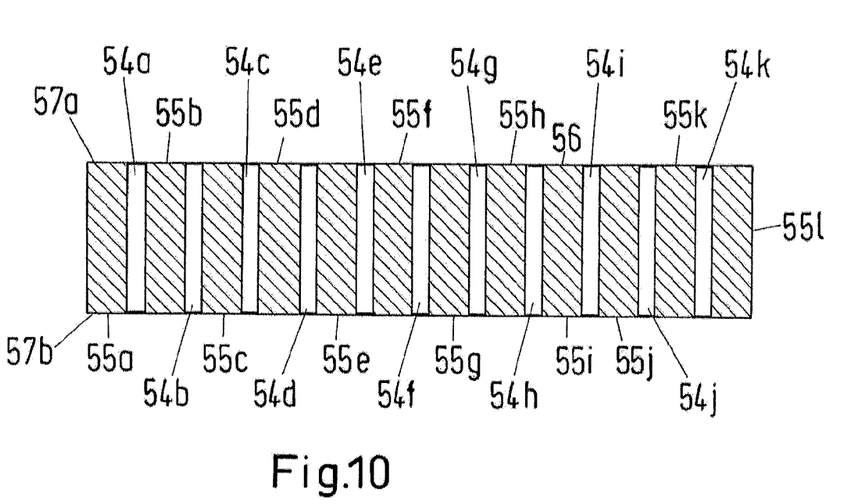

FIG. 10 shows a possible modified construction of the elongated profile. Solid sections 55a-55l, which are represented by line shaded areas in FIG. 10, are separated from neighboring solid areas 55 by gaps or slits 54a-54k. For example, the solid areas 55 can be connected to each other by an upper continuous cover layer 57a and/or by a second, lower continuous cover layer 57b. Therefore, the gaps 54 are covered on the upper side and lower side. Optionally, the gaps 54 can be filled, at least partially or fully, by magnetizable material, such as ferrites. In this case, the solid sections 55 are made of electrically conducting material.

Generally, not only in connection with the examples shown in the figures, the electrically conducting material may be any suitable material, such as aluminum, copper, iron, steel or stainless steel.

The invention claimed is:

1. An arrangement for providing a vehicle with electric energy, wherein the arrangement comprises a generating device adapted to generate an alternating electromagnetic field for inducing an alternating electric current by magnetic induction in a corresponding receiving device, wherein the arrangement comprises:
   a base to which the generating device is attached, wherein base defines a vehicle location where a vehicle may be placed or may travel through, wherein an upper surface of the base defines a bottom of the vehicle location,
   an elevated region sideways of the vehicle location, wherein an upper surface of the elevated region is elevated compared to the upper surface of the base under the vehicle location;
   an elongated profile comprising an electrically conducting material and/or comprising a magnetizable material;
   wherein the elongated profile is integrated in material of the elevated region and extends within the material of the elevated region along an extension of the generating device in a longitudinal direction of the arrangement and wherein an elevated profile—when viewed in a cross sectional area perpendicular to the longitudinal direction—extends within the material of the elevated region upwards towards a level of the upper surface of the elevated region and also extends within the material of the elevated region towards the vehicle location,
   wherein at least an upper section of the elongated profile is located above a level of the upper surface of the base and/or above the generating device,
   wherein a partial region of the elevated region is arranged on a side of the elongated profile next to the vehicle location, wherein the material of the elevated region in the partial region forms a surface of the elevated region facing the vehicle location.

2. The arrangement of claim 1, wherein the elongated profile is provided in an upper section of the elevated region.

3. The arrangement of claim 1, wherein the elevated profile extends in a horizontal direction towards the vehicle location.

4. The arrangement of claim 1, wherein the elongated profile comprises a plurality of gaps between sections consisting of the electrically conducting material.

5. The arrangement of claim 4, wherein at least some of the gaps are filled by the magnetizable material.

6. The arrangement of claim 1, wherein the elongated profile further comprises a compound of the electrically conducting material with the magnetizable material.

7. The arrangement of claim 1, wherein the arrangement comprises two of the elevated regions sideways of the vehicle location, wherein the two elevated regions are arranged on opposite sides of the vehicle location and wherein an elongated profile is attached to each of the two elevated regions.

8. A method of manufacturing an arrangement for providing a vehicle with electric energy, wherein
- a generating device is provided which is adapted to generate an alternating electromagnetic field for inducing an alternating electric current by magnetic induction in a corresponding receiving device,
- the generating device is attached to a base, wherein the base defines a vehicle location where a vehicle may be placed or may travel through, wherein an upper surface of the base defines a bottom of the vehicle location,
- an elevated region is provided sideways of the vehicle location, wherein an upper surface of the elevated region is elevated compared to the upper surface of the base under the vehicle location,
- an elongated profile comprising an electrically conducting material and/or comprising a magnetizable material is integrated in material of the elevated region, so that the elongated profile extends within the material of the elevated region along an extension of the generating device in a longitudinal direction of the arrangement and an elevated profile—when viewed in a cross sectional area perpendicular to the longitudinal direction—extends within the material of the elevated region upwards towards a level of the upper surface of the elevated region and also extends within the material of the elevated region towards the vehicle location,
- wherein at least an upper section of the elongated profile is located above a level of the upper surface of the base and/or above the generating device,
- wherein a partial region of the elevated region is arranged on a side of the elongated profile next to the vehicle location, wherein the material of the elevated region in the partial region forms a surface of the elevated region facing the vehicle location.

9. The method of claim 8, wherein a plurality of gaps is provided between sections of the elongated profile, wherein the sections consist of the electrically conducting material.

10. The method of claim 9, wherein at least some of the gaps are filled by magnetizable material.

11. The method of claim 8, wherein the elongated profile is formed by a compound of the electrically conducting material with the magnetizable material.

12. The method of claim 8, wherein the elongated profile is provided in an upper section of the elevated region.

13. The method of claim 8, wherein the elongated profile extends in horizontal direction towards the vehicle location.

14. The method of claim 8, wherein two of the elevated regions are arranged sideways of the vehicle location, wherein the two elevated regions are arranged on opposite sides of the vehicle location and wherein an elongated profile is attached to each of the two elevated regions.

15. A method of providing a vehicle with electric energy using a generating device to generate an alternating electromagnetic field for inducing an alternating electric current by magnetic induction in a corresponding receiving device, wherein
- a base is attached to the generating device, wherein the base defines a vehicle location where the vehicle may be placed or may travel through, wherein an upper surface of the base defines a bottom of the vehicle location,
- an elevated region is provided sideways of the vehicle location, wherein an upper surface of the elevated region is elevated compared to the upper surface of the base under the vehicle location,
- an elongated profile comprising an electrically conducting material and/or comprising a magnetizable material is used to shield the environment from the alternating electromagnetic field,
- wherein the elongated profile is integrated in material of the elevated region and extends within the material of the elevated region along an extension of the generating device in a longitudinal direction of the arrangement and wherein an elevated profile—when viewed in a cross sectional area perpendicular to the longitudinal direction—extends within the material of the elevated region upwards towards a level of the upper surface of the elevated region and also extends within the material of the elevated region towards the vehicle location,
- wherein at least an upper section of the elongated profile is located above a level of the upper surface of the base and/or above the generating device, and
- wherein a partial region of the elevated region is arranged on a side of the elongated profile next to the vehicle location, wherein the material of the elevated region in the partial region forms a surface of the elevated region facing the vehicle location.

* * * * *